United States Patent
Lee

(10) Patent No.: US 10,625,661 B2
(45) Date of Patent: Apr. 21, 2020

(54) METHOD OF COMPENSATING FOR LEVEL OF HEADLAMP BY USING LANE DEPARTURE WARNING SYSTEM (LDWS)

(71) Applicants: Hyundai Motor Company, Seoul (KR); Kia Motors Corporation, Seoul (KR)

(72) Inventor: Ba-Da Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 189 days.

(21) Appl. No.: 15/829,593

(22) Filed: Dec. 1, 2017

(65) Prior Publication Data
US 2019/0118700 A1   Apr. 25, 2019

(30) Foreign Application Priority Data

Oct. 24, 2017  (KR) .................. 10-2017-0138597

(51) Int. Cl.
 *B60Q 1/115* (2006.01)
(52) U.S. Cl.
 CPC .......... *B60Q 1/115* (2013.01); *B60Q 2300/05* (2013.01); *B60Q 2300/132* (2013.01)
(58) Field of Classification Search
 CPC ...... B60Q 1/115; B60Q 1/04; B60Q 2300/05; B60Q 2300/132
 USPC ......................................................... 701/49
 See application file for complete search history.

(56) References Cited

U.S. PATENT DOCUMENTS

| 5,907,196 | A | * | 5/1999 | Hayami | ................. | B60Q 1/115 |
| | | | | | | 307/10.8 |
| 2001/0040810 | A1 | * | 11/2001 | Kusagaya | ............. | B60Q 1/085 |
| | | | | | | 362/351 |
| 2006/0291222 | A1 | * | 12/2006 | Ando | ..................... | B60Q 1/115 |
| | | | | | | 362/466 |
| 2012/0069593 | A1 | * | 3/2012 | Kishimoto | ............ | B60Q 1/076 |
| | | | | | | 362/511 |
| 2015/0165962 | A1 | | 6/2015 | Min | | |
| 2016/0167567 | A1 | * | 6/2016 | Foltin | .................... | B60Q 1/085 |
| | | | | | | 315/82 |

FOREIGN PATENT DOCUMENTS

| KR | 10-1082420 B1 | 11/2011 |
| KR | 10-1230335 B1 | 2/2013 |
| KR | 10-2015-0047377 | 7/2017 |

* cited by examiner

*Primary Examiner* — Krishnan Ramesh
(74) *Attorney, Agent, or Firm* — Mintz Levin Cohn Ferris Glovsky and Popeo, P.C.; Peter F. Corless

(57) ABSTRACT

A method of compensating for a level of a headlamp using a lane departure warning system is provided. The method adjusts a level of a headlamp using a camera of a lane departure warning system. In particular, the method includes calculating, by an LDWS camera, a predetermined irradiation angle of a headlamp and calculating, by the LDWS camera, a cut-off inclination of a low beam in a predetermined distance. Additionally, the method includes driving a lamp actuator when the cut-off inclination is less than a predetermined threshold inclination and re-adjusting the cut-off inclination.

14 Claims, 6 Drawing Sheets

FIG. 4

| NO | LOAD CONDITION | SENSOR VALUE | HEIGHT OF HEADLAMP (h2) | CUT-OFF LINE (h1) | CUT-OFF INCLINATION |
|---|---|---|---|---|---|
| 1 | DRIVER'S SEAT | 0° | A mm | B mm | -1.00% |
| 2 | DRIVER'S SEAT + PASSENGER SEAT | 2.9° | A - 7 mm | B - 1 mm | -1.34% |
| 3 | DRIVER'S SEAT + ALL SEATS OCCUPIED | 11° | A + 7 mm | B - 1 mm | -1.34% |
| 4 | DRIVER'S SEAT + ALL SEATS OCCUPIED + LOADED TRUNK | 14.8° | A - 1 mm | B - 67 mm | -1.66% |
| 5 | DRIVER'S SEAT + FULLY LOADED TRUNK | 14.6° | A + 24 mm | B + 37 mm | -0.87% |

METHOD OF COMPENSATING FOR LEVEL OF HEADLAMP BY USING LANE DEPARTURE WARNING SYSTEM (LDWS)

CROSS-REFERENCE TO RELATED APPLICATIONS

This application claims priority under 35 U.S.C. § 119 to Korean Patent Application No. 10-2017-0138597, filed on Oct. 24, 2017, the disclosure of which is incorporated herein by reference in its entirety.

BACKGROUND

1. Field of the Disclosure

The present disclosure relates to a method of compensating for a level of a headlamp using a lane departure warning system, and more particularly, to a method of compensating for a level of a headlamp which adjusts a level of a headlamp by using a camera of a lane departure warning system.

2. Description of the Related Art

Recently, various types of light sources, such as high intensity discharge (HID) headlamp and a light emitting diode (LED) headlamp, as well as a halogen lamp have been used in a headlamp of a vehicle. Typically, regulations require that when a light source of 2,000 lumens or greater is used, an auto leveling device is required and the HID headlamp and the LED headlamp partially correspond to the target of the application of the auto leveling device. Additionally, a manufacturing company applies the auto leveling device to a headlamp having 2,000 lumens or less to improve customer satisfaction. Presently, the auto leveling device is applied to many vehicles manufactured using of the LED headlamps.

Accordingly, in the related art a headlamp auto leveling system includes a speed sensor configured to output a speed signal of a vehicle while being driven, a driving actuator configured to adjust an irradiation angle of a headlamp and a rear vehicle height sensor which is disposed at a rear side of the vehicle and configured to output a sensor signal in response to a change in a vehicle height based on a weight. Additionally, an auto leveling electronic control unit (ECU) is configured to calculate a reference sensor signal, in which a noise signal corresponding to a road condition is removed, and is configured to operate a driving actuator based on the reference sensor signal and an operational state of the vehicle.

However, the related art controls the headlamp in response to the vehicle height according to a weight of a rear side (storage compartment). Accordingly, when weight of all of the seats at a center portion of the vehicle is adjusted and a height of a cut-off line of the headlamp is generally decreased, a visible distance is not secured due to the same irradiation angle of the headlamp.

The above information disclosed in this section is merely for enhancement of understanding of the background of the disclosure and therefore it may contain information that does not form the prior art that is already known in this country to a person of ordinary skill in the art.

SUMMARY

The present disclosure provides a method of compensating for a level of a headlamp, which secures continuity of the visible distance even though vehicle weight is adjusted by considering weight disposed within a center portion of a vehicle and considering the weight disposed within a rear portion of the vehicle.

In an aspect of an exemplary embodiment of the present disclosure a method of compensating for a level of a headlamp using a lane departure warning system (LDWS) may include calculating, by an LDWS camera, a predetermined irradiation angle of a headlamp, calculating, by the LDWS camera, a cut-off inclination of a low beam in a predetermined distance, and driving a lamp actuator when the cut-off inclination is less than a predetermined threshold inclination, and re-adjusting the cut-off inclination.

The calculating of the irradiation angle may include calculation based on a vehicle height according to a weight of the vehicle installed with the LDWS camera. When the vehicle height and a weight are varied according to a position of an occupied seat of the vehicle the vehicle height may be considered.

In some exemplary embodiments, calculating an irradiation angle of the headlamp may include securing a visible distance by irradiating a low beam in a front direction of the vehicle using the lamp actuator. In particular, the weight may be calculated by detecting weight for an internal position of an occupied seat of the vehicle and weight for an external position of a storage compartment at a rear side of the vehicle.

The cut-off inclination may be varied based on a weight of a seat portion or a center portion of the vehicle when weight of a storage compartment or a rear side of the vehicle is the same. The lamp actuator may be configured to adjust a visible distance by measuring or compensating for the cut-off inclination. The cut-off inclination may be calculated by the LDWS camera using a difference between a height h1 of a center line of a low beam and a height h1 of a cut-off line of the head lamp in a predetermined distance L. In some exemplary embodiments, the height h1 of the cut-off line may be determined based on a front vehicle and a wall surface recognized by the LDWS camera or the predetermined distance. The cut-off inclination may be calculated in a form of a percentage by using Equation (h1−h2)/L by the LDWS camera. The predetermined threshold inclination may be set to about −1.0% for securing a visible distance.

In other exemplary embodiments, driving a lamp actuator may further include transferring, by the LDWS camera, a driving signal for adjusting a height of a cut-off line to an electronic control unit (ECU). The driving of a lamp actuator may further include transferring, by an ECU, a driving signal to the lamp actuator. The lamp actuator may be driven based on a change in the cut-off inclination varied according to a weight of a seat portion or a center portion of the vehicle when weight measured by a rear axis sensor of the vehicle is the unchanged. In particular, during driving of a lamp actuator, when the cut-off inclination is less than a predetermined threshold inclination, the cut-off inclination may be increased by about 0.1% by re-adjusting the lamp actuator.

Additionally, the lamp actuator may include a levelling motor configured to adjust the cut-off inclination. The cut-off inclination may be varied by adjusting the headlamp in stages in consideration of a unit adjustment value (e.g., resolution) of the levelling motor. According to the present disclosure including the foregoing configuration an improved visible distance may be secured in an actual field to improve customer satisfaction.

BRIEF DESCRIPTION OF THE DRAWINGS

The above and other objects, features and other advantages of the present disclosure will be more clearly understood from the following detailed description when taken in conjunction with the accompanying drawings, in which:

FIG. 4 is an exemplary table representing a characteristic of the headlamp according to a weight of a vehicle according to the exemplary embodiment of the present disclosure;

DETAILED DESCRIPTION

Figure 1:
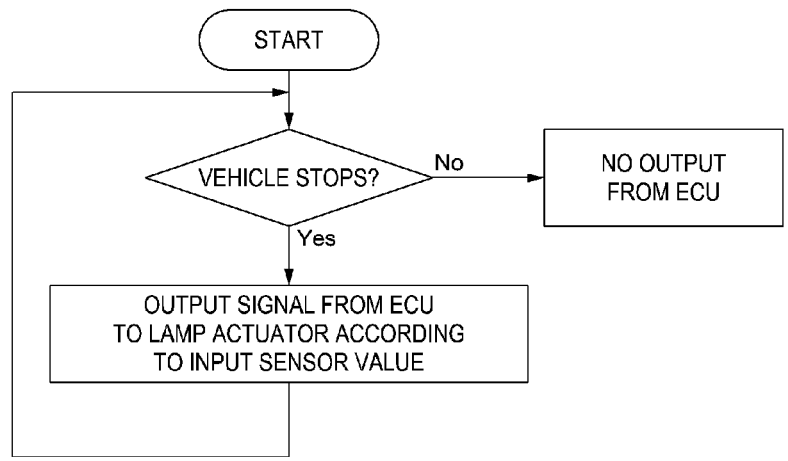
FIG. 1 is an exemplary flowchart illustrating a method of adjusting a headlamp in the related art.

While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, the present disclosure will be described in detail with reference to the contents described in the accompanying drawings. However, the present disclosure is not restricted or limited by exemplary embodiments. Like reference numerals suggested in each drawing designate members which perform substantially the same functions.

FIG. 1 is an exemplary flowchart illustrating a method of adjusting a headlamp in the related art. Referring to FIG. 1, the related art controls a headlamp in response to a vehicle height according to a weight of a rear side (storage compartment. Accordingly, even when weight of all of the seats at a center portion of a vehicle change, a visible distance is not based on a change to the irradiation angle of the headlamp. In particular, when large weight, (e.g., such as three or four passengers) and cargo (e.g., a golf bag or luggage) in a storage compartment is loaded in a vehicle because the lamp becomes dark in a vehicle.

A general leveling system is a system which confirms a change in a vehicle height of front and rear sides of the vehicle incurring by a change in weight of the vehicle, such as a driver, a passenger, and cargo in a storage compartment, through sensors applied to front and rear shafts, and appropriately adjusts an irradiation angle of a headlamp by an electronic control unit (ECU). The irradiation angle of the lamp is defined, and a corresponding loading weight condition includes when a driver gets in a vehicle, when a driver and a passenger enter a vehicle, when a driver's seat and all of the seats are occupied, when a driver and all of passengers enter a vehicle and a storage compartment is fully loaded (e.g., a loaded weight of the storage compartment is up to permitted axle weight (PAW) or gross vehicle weight (GVW) of the vehicle) or when a driver enters a vehicle and a storage compartment is fully loaded (e.g., a loaded weight of the storage compartment is PAW or GVW of the vehicle)

Typically, in a vehicle, a front sensor is removed to decrease cost and a leveling system of the headlamp is adjusted by a rear sensor. When only the rear sensor is applied, the sensor values under conditions when a vehicle and a storage compartment are under maximum load (e.g., when a driver and all of passengers enter a vehicle and a storage compartment is fully loaded or when a driver enters a vehicle and a storage compartment is fully loaded) are the same in most of the vehicles, so that the ECU outputs the same quantity of adjustment of an irradiation angle of the headlamp. However, a ground clearance of the headlamp has a significant difference under the two load conditions, so that when the quantity of adjustment of the irradiation angle is tuned by the method in the related art for meeting the laws, a driver observe a view is limited (e.g., dark or low light conditions) when a vehicle and a storage compartment are under maximum load. The phenomenon occurs due to a decrease in a visible distance of the headlamp by the headlamp leveling system and is problem incurring due to a decrease in the number of leveling sensors (e.g., a decrease in cost), and the present disclosure aims to solve the problem without a separate increase in cost.

Figure 2:
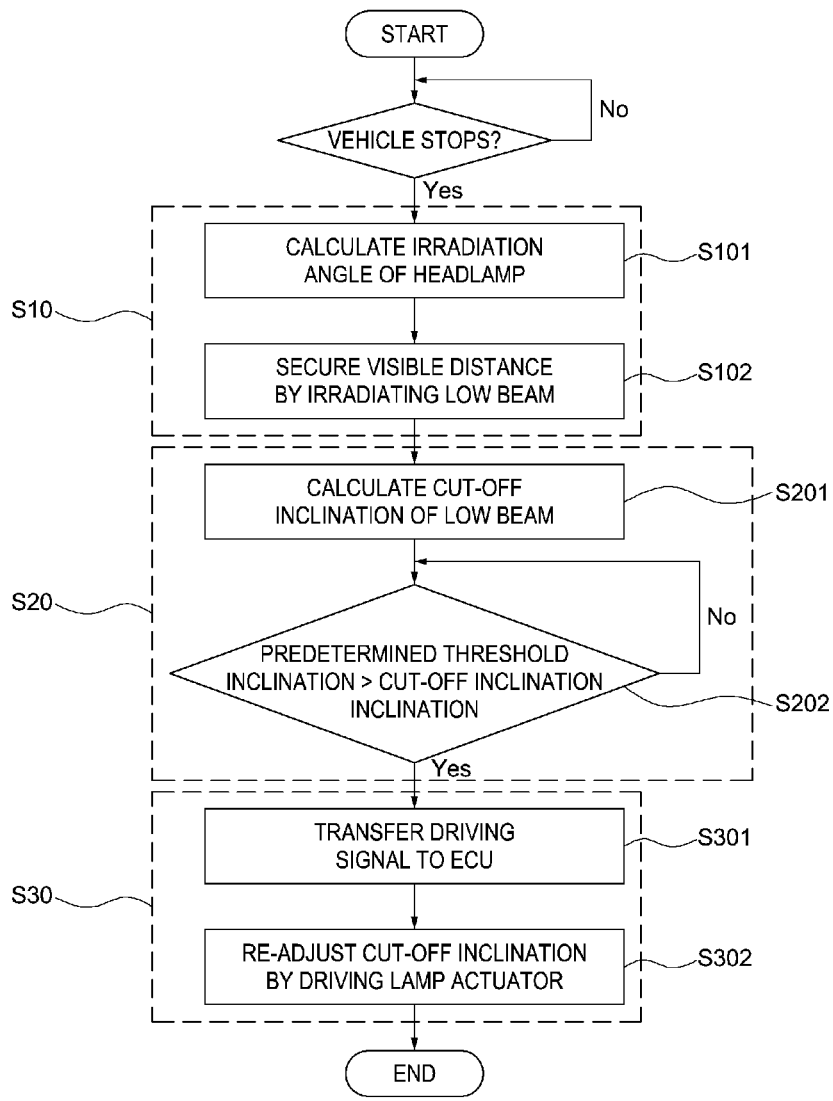
FIG. 2 is an exemplary flowchart illustrating a method of compensating for a level of a headlamp by using a lane departure warning system according to the present disclosure.

FIG. 2 is an exemplary flowchart illustrating a method of compensating for a level of a headlamp using a lane departure warning system according to the present disclosure. Referring to FIG. 2, the present disclosure may include calculating, by a lane departure warning system (LDWS) camera S10, a predetermined irradiation angle of a headlamp S10; calculating, by the LDWS camera, a cut-off inclination of a low beam in a predetermined distance S20, and readjusting the cut-off inclination by driving a lamp actuator when the cut-off inclination is less than a predetermined threshold inclination S30.

Generally, the LDWS camera has been researched and developed to prevent an accident when a lane is not clearly viewed due to low light conditions, inclement weather or driver impairment, (e.g., a rain covered road or fog, or a driver crosses a lane due to driving while drowsy). Additionally, implement the LDWS, a technology for enabling a driver to more clearly recognize a travelling lane through a camera mounted at a front side of a vehicle is required. Various indications, such as a road sign, are present and lanes of various colors are present on a road. Accordingly, a driver needs to clearly discriminate and recognize a lane, and a lane recognition condition includes a driver's recognition of white, yellow and blue, and is based on geometric modeling in which lanes are straight and are parallel, and have predetermined sizes and widths to meet at one vanishing point. The LDWS camera was originally developed for preventing an accident, but the present disclosure utilizes the LDWS camera for recognizing a front visible distance to secure a visible distance of a driver according to a weight of a vehicle.

According to the present disclosure, the calculating S10 may include an operation of calculating an irradiation angle of a headlamp S101 and an operation of securing a visible distance by irradiating a low beam S102. The calculating, by the LDWS camera, S20 may include calculating a cut-off inclination of the low beam in a predetermined distance S201 and comparing a predetermined threshold inclination with the cut-off inclination S202. Finally, the readjusting the cut-off inclination S30 may include transferring a driving signal to an ECU S301 and re-adjusting the cut-off inclination by driving a lamp actuator S302.

In the operation S101 of calculating the irradiation angle of the headlamp, an irradiation angle of the headlamp may be calculated based on a vehicle height according to a weight in the vehicle installed with the LDWS camera. During operation of the vehicle, a driver of a facing vehicle (e.g., a vehicle disposed in the direction that the vehicle is traveling) is flashed (e.g., subject to a sudden illumination) during an acceleration of the vehicle or an irradiation distance is decreased during a deceleration, in order to prevent the visual disturbance, an auto leveling system is required in an HID vehicle having 200 ml or more. The auto levelling system may include vehicle height sensors mounted at sides of front and rear suspensions, respectively, to recognize an operational condition of the vehicle.

The vehicle height according to a weight may be calculated based on a vehicle height that is varied based on a weight varied as determined by a position of a seat occupied within the vehicle. The weight may be calculated by detecting weight for an internal position of an occupied seat of the vehicle and weight for an external position of a storage compartment at a rear side of the vehicle.

The securing the visible distance by irradiating the low beam S102 may include calculating a predetermined irradiation angle of the headlamp based on the vehicle height determined by a weight in the vehicle installed with the LDWS camera, and emitting, by the lamp actuator, light in a front direction of the vehicle. Before the lamp actuator is operated, a speed sensor, a longitudinal acceleration sensor, a pressure sensor, a rear vehicle height sensor, or an ECU capable of performing auto levelling may be further included. The calculating the cut-off inclination of the low beam in the predetermined distance S201 may include calculating, by the LDWS camera, a difference between a height $h2$ of a center line of the low beam and a height $h1$ of the cut-off line and a distance between the center line of the low beam and the cut-off line in the predetermined distance.

In the present disclosure, the auto levelling ECU may be configured to control front and rear angle sensing information may be configured to convert the angle sensing information into a vehicle height based on a vehicle height value output from the vehicle height sensor, calculate an inclination of the vehicle based on the converted vehicle height, and convert a levelling operation angle into the number of strokes and steps by the inclination of the vehicle to adjust the headlamp in real time. The calculating, by the LDWS camera of the cut-off inclination of the low beam will be described below in detail.

The comparing the predetermined threshold inclination with the cut-off inclination may be performed through initialization by the LDWS camera S202. In a factory initialization process, all of the LDWS camera, the headlamp levelling, an aiming device, and the like pass through an initialization process. In particular, a position, at which the cut-off inclination based on the height $h2$ of the center line of the low beam in the headlamp is about −1.0%, may be defined as a threshold inclination. Additionally, an initial value of the cut-off line may be adjusted to the range of the threshold inclination. This process may be referred to as an aiming process, and a change in the cut-off inclination varied according to a weight later may be derived through the aiming process.

The readjusting the cut-off inclination by driving a lamp actuator S30 may include driving the lamp actuator when the cut-off inclination is less than the predetermined threshold inclination. The cut-off inclination may be adjusted based on a weight of a seat portion or a center portion of the vehicle when weight of the storage compartment or the rear side of the vehicle is unchanged. In particular, the third operation may further include transferring, by the LDWS camera, the driving signal configured to adjust the height of the cut-off line to the ECU S301 and transferring, by the ECU, the driving signal to the lamp actuator S302.

The transferring the driving signal to the ECU S301 may include the rear vehicle height sensor, in which the lamp actuator is disposed at the rear side of the vehicle that is configured to output a sensor signal corresponding to a change in the height of the vehicle. Additionally, an auto levelling ECU may be configured to apply a rate value calculated from an acceleration signal calculated based on a speed signal and the sensor signal to the sensor signal, and is configured to calculate a reference sensor signal, in which a noise signal corresponding to a road condition included in the sensor signal is removed. The lamp actuator may be configured to be operated according to the reference sensor signal and an operational state of the vehicle.

The re-adjusting the cut-off inclination by driving the lamp actuator S302 may include a process of adjusting a visible distance by measuring or compensating for the cut-off inclination. In particular, the speed sensor, the longitudinal acceleration sensor, the pressure sensor, the rear vehicle height sensor, and the like may be involved. The present disclosure may include generating a driving signal based on the cut-off inclination measured by the LDWS camera and the LDWS camera. The ECU and the lamp actuator may be interlinked through the driving signal generated in the LDWS camera to compensate for a level of the lamp.

Figure 3:
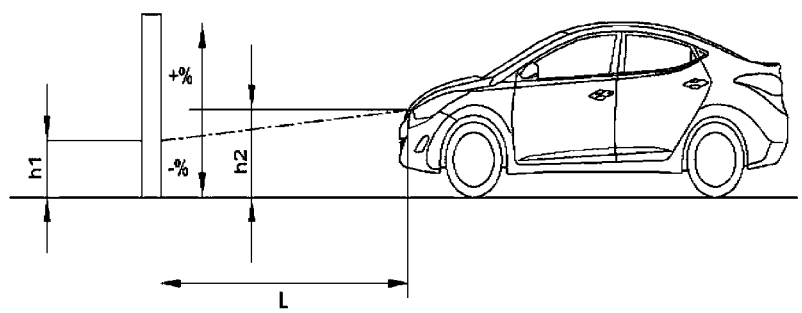
FIG. 3 is an exemplary diagram illustrating a calculation of a cut-off inclination of a headlamp according to an exemplary embodiment of the present disclosure.

FIG. 3 is an exemplary diagram illustrating a calculation of a cut-off inclination of the headlamp according to the exemplary embodiment of the present disclosure. Referring to FIG. 3, L may represent a distance of about 10,000 mm between a vehicle and a screen, h1 represents a height (mm) of a cut-off line of a low beam on the screen, and h2 represents a height (mm) of a center line of the low beam. The cut-off inclination may be calculated by the LDWS camera using a difference between the height h2 of the center line of the low beam and the height h1 of the cut-off line of the headlamp in a predetermined distance L.

When weight of the storage compartment or the rear side of the vehicle is unchanged, the visible distance may be adjusted by measuring and compensating for the cut-off inclination that is varied according to a weight of the seat portion and the center portion of the vehicle by using the LDWS camera. During operation of the vehicle, the low beam use must comply with regulatory requirements to enable the visible distance may be adjusted within the range of the regulated law.

FIG. 4 is an exemplary table representing a characteristic of the headlamp according to a weight of a vehicle according to the exemplary embodiment of the present disclosure. Referring to FIG. 4, changes in a rear axis posture recognized by the sensor under the fourth and fifth weight conditions of the table are the same. However, a change in a height of the headlamp may be increased, to enable a height of a cut-off line viewed on a screen 10 M ahead may also be varied. The present disclosure outputs a value matched with an input by a scheme of receiving an input of a rear weight sensor and outputting a previously tuned value. During the tuning, the height h2 of the headlamp and the height h1 of the cut-off line viewed on the screen 10 M ahead may be measured while determine weight for each load condition, and a cut-off inclination may be calculated by a more simple calculation.

The sensor value (e.g., input value) may be the same (e.g., the sensor value having a difference of about 0.2 degree may be considered as the same value). Accordingly, when the ECU is configured to output the same output value, but a difference in the cut-off inclination may be greater due to the change in a vehicle position. Further, A represents a center of a low beam bulb of the head lamp when a driver enters the vehicle, and B represents a height of a headlamp cut-off viewed on the screen 10 M ahead. A load condition of condition 5 may consider a driver and a storage compartment and thus the excess cargo is disposed within in the storage compartment, to enable a change in a vehicle posture under the stated load condition is considerably different from that when the seats are fully occupied and cargo is disposed in the storage compartment evenly. In other words, the levelling ECU receives the same sensor value, but may not determine whether the sensor value corresponds to condition with the driver and the fully loaded storage compartment or the driver, passengers and the fully loaded storage compartment.

Figure 5:
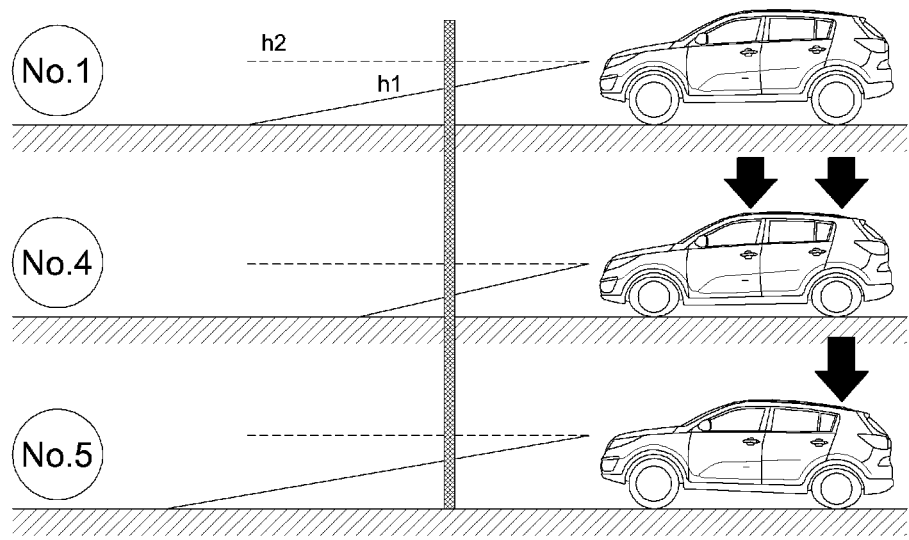
FIG. 5 is an exemplary diagram illustrating a visible distance according to vehicle weight according to the exemplary embodiment of the present disclosure.

FIG. 5 is an exemplary diagram illustrating a visible distance according to vehicle weight according to the exemplary embodiment of the present disclosure. Referring to FIG. 5, in the case of when the conditions that consider the driver and the fully loaded storage compartment or the driver, passengers and the fully loaded storage compartment, the vehicle has different weight, but the sensor values are the same, and the heights of the headlamp under the different conditions vary, to enable the visible distance changes. The headlamp, which heads in a lower direction by about 1.0% when one driver drives the vehicle, heads in the lower direction by 1.66% under the condition the driver and the fully loaded storage compartment, enable a visible distance to be decreased and the drivers may observe a decrease in the illumination. To increase the visible distance, the amount of reducing the headlamp in the leveling needs to be decreased when the vehicle includes a driver, passengers and the fully loaded storage compartment, but in this case, an inclination of the cut-off line is about 0.5% or less which does not satisfy the development standard regulated under the law.

Accordingly, a visible distance according to a weight of the center portion (all of the seats) even though weight of the rear side is the same may be considered by recognizing the cut-off inclination. In particular, a threshold inclination may be set and whether to perform the levelling may be determined based on the set threshold inclination. The predetermined threshold inclination according to the exemplary embodiment of the present disclosure may be set to about −1.0% for securing a visible distance.

Figure 6A:
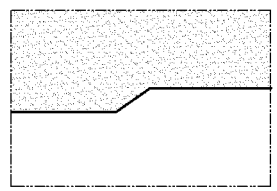
FIG. 6A is an exemplary representation of a height of a cut-off line based on 3 M during a factory initialization process according to the exemplary embodiment of the present disclosure.
Figure 6B:
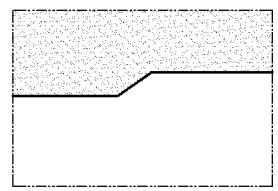
FIG. 6B is an exemplary representation of a height of a cut-off line based on 2 M according to the exemplary embodiment of the present disclosure.
Figure 6C:
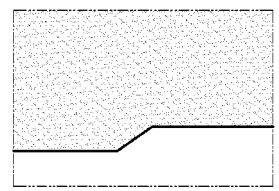
FIG. 6C is an exemplary representation of a height of a cut-off line based on 5 M according to the exemplary embodiment of the present disclosure.

FIGS. 6A-6C are exemplary diagrams illustrating a process of recognizing a height of a cut-off line according to the exemplary embodiment of the present disclosure. Referring to FIGS. 6A-6C, a height of a cut-off line may be recognized by using a front vehicle or a wall surface recognized by the LDWS camera, or a predetermined distance.

FIG. 6A represents a height of a cut-off line based on 3 M during a factor initialization process. FIG. 6B represents a height of a cut-off line based on 2 M. FIG. 6C represents a height of a cut-off line based on 5 M. A process of determining a height of a cut-off line according to the exemplary embodiment of the present disclosure may be implemented by turning data (1 pixel=x mm) through an actual measurement during the vehicle development by using a camera image, setting a final target of the levelling system of the headlamp is −1.0%, and recognizing the measured distance by the LDWS camera. The camera may be a video camera or other imaging device.

The cut-off line refers to a line between a low illumination portion and a higher intensity illumination portion generated when a low beam of the lamp is shined at a screen. This is called a cut-off line of the lamp, and the cut-off line may be recognized by the LDWS camera of the present disclosure. The LDWS camera may be configured to recognize a soft line, as well as a clear line, through tuning. After the factory initialization process, the LDWS camera may be configured to include a reference cut-off line according to a distance, and recognize the position of the cut-off line with respect to the reference cut-off line.

The camera may be configured to recognize the cut-off line using a front vehicle or a wall surface during the driving (e.g., stop state) by the driver and an input value of the sensor may be within a range of a sensor value requiring the compensation when the vehicle includes the driver and the fully loaded storage compartment or when the vehicle includes the driver, passengers and the fully loaded storage compartment. The present disclosure may determine whether the current cut-off line is high or low by comparing the current cut-off line with a reference cut-off line image for each distance. In respect to determined that the current cut-off line is low, a height of the cut-off line may be increased in the unit of about 0.1%. In the exemplary embodiment of the present disclosure, the height of the cut-off line may be adjusted upwardly in the unit of about 0.1%, but is not limited thereto.

In the foregoing, the present disclosure has been described in detail with reference to the exemplary embodiment, but those skilled in the art may understand that the exemplary embodiment may be variously modified without departing from the scope of the present disclosure. Accordingly, the scope of the present disclosure shall not be defined while being limited to the exemplary embodiment, but shall be defined by all of the changes or modified forms derived from the equivalent concepts to the claims, as well as the claims to be described below.

What is claimed is:

1. A method of compensating for a level of a headlamp by using a lane departure warning system (LDWS), comprising:
    calculating, by an LDWS camera installed within a vehicle, an irradiation angle of the headlamp based on a height and a weight of the vehicle installed with the LDWS camera;
    securing a visible distance by irradiating a low beam in a front direction of the vehicle in accordance with the irradiation angle of the headlamp;
    calculating, by the LDWS camera, a cut-off inclination of the low beam in a predetermined distance; and
    re-adjusting the cut-off inclination by driving by a lamp actuator when the cut-off inclination is less than a predetermined threshold inclination.

2. The method of claim 1, wherein the height and weight of the vehicle are varied based on a position of an occupied seat of the vehicle.

3. The method of claim 1, wherein the weight is calculated by detecting weight for an internal position of an occupied seat of the vehicle and weight for an external position of a storage compartment at a rear side of the vehicle.

4. The method of claim 1, wherein the cut-off inclination is varied based on a weight of a seat portion or a center portion of the vehicle when weight of a storage compartment or a rear side of the vehicle is the same.

5. The method of claim 4, wherein the lamp actuator is configured to adjust a visible distance by measuring or compensating for the cut-off inclination.

6. The method of claim 4, wherein the cut-off inclination is calculated by the LDWS camera using a difference between a height of a center line of a low beam and a height of a cut-off line of the head lamp in a predetermined distance.

7. The method of claim 6, wherein the height of the cut-off line is determined based on a front vehicle and a wall surface recognized by the LDWS camera or the predetermined distance.

8. The method of claim 4, wherein the cut-off inclination is calculated in a form of a percentage using Equation (h1−h2)/L by the LDWS camera.

9. The method of claim 1, wherein the predetermined threshold inclination is set to −1.0% for securing a visible distance.

10. The method of claim 1, further comprising:
    transferring, by the LDWS camera, a driving signal for adjusting a height of a cut-off line to an electronic control unit (ECU).

11. The method of claim 1, wherein driving a lamp actuator further includes:
    transferring, by an electronic control unit (ECU), a driving signal to the lamp actuator.

12. The method of claim 1, wherein the lamp actuator is driven based on a change in the cut-off inclination varied according to a weight of a seat portion or a center portion of the vehicle when weight measured by a rear axis sensor of the vehicle is the same.

13. The method of claim 12, wherein during driving of a lamp actuator, when the cut-off inclination is less than a predetermined threshold inclination, the cut-off inclination is increased by 0.1% by re-adjusting the lamp actuator.

14. The method of claim 12, wherein the lamp actuator includes a levelling motor for configured to adjust the cut-off inclination, and the cut-off inclination is adjusted by adjusting the headlamp in stages in consideration of a unit adjustment value of the levelling motor.

* * * * *